United States Patent
Civlin

(10) Patent No.: US 7,269,828 B2
(45) Date of Patent: Sep. 11, 2007

(54) METHOD FOR SAFELY INSTRUMENTING LARGE BINARY CODE

(75) Inventor: Jan Civlin, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 752 days.

(21) Appl. No.: 10/315,967

(22) Filed: Dec. 9, 2002

(65) Prior Publication Data

US 2004/0111719 A1 Jun. 10, 2004

(51) Int. Cl.
*G06F 9/45* (2006.01)
*G06F 9/44* (2006.01)

(52) U.S. Cl. ............... 717/158; 717/110; 717/112; 717/130; 717/170

(58) Field of Classification Search .......... 717/110, 717/130; 711/112, 170
See application file for complete search history.

(56) References Cited

U.S. PATENT DOCUMENTS

| | | | | |
|---|---|---|---|---|
| 6,073,252 | A * | 6/2000 | Moyer et al. | 714/7 |
| 6,077,311 | A * | 6/2000 | Lichtenstein et al. | 717/128 |
| 6,898,785 | B2 * | 5/2005 | Ramasamy et al. | 717/129 |
| 7,058,561 | B1 * | 6/2006 | Kumar | 703/22 |
| 2002/0049963 | A1 * | 4/2002 | Beck et al. | 717/130 |
| 2002/0152455 | A1 * | 10/2002 | Hundt et al. | 717/131 |
| 2002/0188932 | A1 * | 12/2002 | Hundt et al. | 717/154 |
| 2003/0037318 | A1 * | 2/2003 | Ramasamy et al. | 717/130 |
| 2003/0079215 | A1 * | 4/2003 | Hundt et al. | 717/164 |
| 2003/0204374 | A1 * | 10/2003 | Madsen et al. | 702/186 |

OTHER PUBLICATIONS

"Self Organizing Storage", IBM Technical Disclosure Bulletin, May 1971, NN71053722, retrieved from EAST database search Jan. 30, 2006.*

Aral, Ziya; Gertner, Ilya; Schaffer, Greg; "Efficient Debugging Primitives for Multiprocessors", p. 87-95, ACM, retrieved from scholar.google.com search Mar. 2, 2006.*

Aral, Ziya; Gertner, Ilya; Parasight: A High Level Debugger/Profiler Architecture for Shared-Memory Multiprocessors, p. 131-139, 1988, retrieved from scholar.google.com search Mar. 2, 2006.*

Hunt, Galen; Brubacher, Doug; "Detours: Binary Interception of Win32 Functions", 10 pages, Proceedings of 3rd USENIX Windows NT Symposium, Jul. 12-15, 1999, retrieved from scholar.google.com search Mar. 2, 2006.*

* cited by examiner

*Primary Examiner*—Mary Steelman
(74) *Attorney, Agent, or Firm*—Martine Penilla & Gencarella, LLP

(57) ABSTRACT

A method is provided for safely editing a binary code to be executed on a computer system. The method allows the binary code to be directly edited without compromising its integrity. More specifically, a larger binary code is transformed into a number of smaller binary code segments having sizes within a reference range of a control transfer function such as a branch instruction. A branch slamming operation can then used to displace a binary instruction contained within a smaller binary code segment with a branch instruction referring to a binary patch that is appended to the smaller binary code segment. The binary instruction displaced by the branch instruction is preserved in the binary patch. Upon completion of the binary patch execution, the smaller binary code segment continues executing with a binary instruction immediately following the branch instruction. The method for safely editing the binary code is particularly useful with large binary codes having sizes greater than the reference range of the control transfer function.

34 Claims, 15 Drawing Sheets

| Function | Original Beginning Address | New Beginning Address |
|---|---|---|
| 1 | Function 1 Address in Original Binary Code | New Shared Object Address for Function 1 |
| 2 | Function 2 Address in Original Binary Code | New Shared Object Address for Function 2 |
| ... | ... | ... |
| "NF" | Function "NF" Address in Original Binary Code | New Shared Object Address for Function "NF" |

Fig. 9

METHOD FOR SAFELY INSTRUMENTING LARGE BINARY CODE

CROSS REFERENCE TO RELATED APPLICATIONS

This application is related to U.S. patent application Ser. No. 10/315,968, filed Dec. 9, 2002, and entitled "Method for Branch Slamming as a Safe Mechanism for Binary Code Editing," which is incorporated herein by reference.

BACKGROUND OF THE INVENTION

1. Field of the Invention

The present invention relates generally to a computer system, and more particularly, to a method for safely instrumenting large binary code used to operate the computer system.

2. Description of the Related Art

In general, computer systems are controlled by computer programs. Computer programs may be developed using a number of different programming languages. The number of different programming languages can be sorted into at least three classifications: high-level, low-level, and machine.

High-level programming languages (e.g., C, C++, Java, etc . . . ) allow programs to be developed that are more or less independent of a particular computer system on which the programs will execute. High-level programming languages are also easier to read, write, and maintain. However, a program written in a high-level language must be translated into a machine language before it can be executed. Translation of the high-level language into the machine language can be performed by either a compiler or an interpreter.

As compared to the high-level language, a low-level language is closer to the machine language necessary for execution of the program. A low-level language contains the same instructions as the machine language, but the instructions and variables are identified by names rather than only numbers. Thus, low-level languages are more readily understood than machine languages. Assembly languages are classified as low-level languages. An assembler program is used to translate assembly language programs into machine language.

Machine languages consist entirely of numbers and are the only languages understood by a computer system. Machine languages are actually sequences of binary instructions consisting of bits (i.e., 0's and 1's). Thus, machine languages are often referred to as binary codes. Machine languages actually control the computer system circuitry. Each type of computer system has its own unique circuitry. Therefore, each type of computer system has its own unique machine language. To be executable by a computer system, every program must be translated into the machine language that the computer system understands.

Binary codes (i.e., machine languages) are easily understood and implemented by computer systems, but are nearly impossible for people to understand and use. However, there are situations when it is necessary for people to work directly with and modify binary codes. In these situations, an original source code (i.e., high-level language version of the program) is usually not available and only a portion of the binary code may actually be understood. A modification or edit of the binary code should be performed in a manner that maintains the binary code's integrity. Otherwise, the binary code may become non-executable or executable with errors.

In view of the foregoing, there is a need for a method for safely editing a binary code to be executed on a computer system. The method should ensure the integrity of the binary code to maintain its proper execution while preventing potentially damaging errors.

SUMMARY OF THE INVENTION

Broadly speaking, the present invention fills these needs by providing a method for safely editing a binary code, including a large binary code, to be executed on a computer system. The present invention allows the binary code to be directly edited without compromising its integrity. More specifically, one or more call instructions are used to facilitate transformation of the binary code into smaller binary code segments (i.e., shared objects) having sizes within a reference range of a control transfer function (e.g., branch instruction). A branch slamming operation can then used to displace a binary instruction contained within a smaller binary code segment with a branch instruction referring to a binary patch that is appended to the smaller binary code segment. The binary instruction displaced by the branch is preserved in the binary patch. Upon completion of the binary patch execution, the smaller binary code segment continues executing with a binary instruction immediately following the branch instruction. The transformation of the binary code into smaller binary code segments and the branch slamming operation are two distinctly different processes that can be performed independently of one another. It should be appreciated that the present invention can be implemented in numerous ways, including as a process, an apparatus, a system, a device, or a method. Several embodiments of the present invention are described below.

In one embodiment, a method for transforming a binary code is disclosed. The method includes identifying a function body in the binary code. The function body is copied from the binary code to a shared object. The method further includes modifying a call instruction in the binary code to refer to the shared object, wherein the call instruction previously referred to the function body in the binary code.

In another embodiment, a method for editing a binary code is disclosed. The method includes transforming the binary code into a plurality of binary code segments. A branch instruction is inserted into at least one of the plurality of binary code segments. The method further includes creating a binary patch to correspond to the branch instruction. The binary patch is appended to a binary code segment in which the branch instruction is inserted.

In another embodiment, a method for performing a combined transformation and branch slamming operation on a binary code is disclosed. The method includes identifying a function body in the binary code. The function body is copied from the binary code to a shared object. A call instruction corresponding to the function body copied from the binary code is modified to refer to the shared object. The method further includes identifying an instruction in the function body to be replaced by a branch instruction and replacing the instruction with the branch instruction. The method further includes preparing a binary patch to correspond to the branch instruction. The binary patch is then appended to the shared object containing the function body copied from the binary code.

In another embodiment, a computer program embodied on a computer readable medium for editing a binary code is disclosed. The computer readable medium includes program instructions for transforming the binary code into a plurality of binary code segments. Program instructions are also provided on the computer readable medium for inserting a branch instruction into at least one of the plurality of binary code segments. The computer readable medium includes further program instructions for creating a binary patch to correspond to the branch instruction. The computer readable medium also includes program instructions for appending the binary patch to a binary code segment in which the branch instruction is inserted.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which:

FIG. 9 is an illustration showing an address map for a binary code transformation, in accordance with an embodiment of the present invention;

DETAILED DESCRIPTION OF THE PREFERRED EMBODIMENTS

An invention is disclosed for a method for safely editing a binary code to be executed on a computer system. Broadly speaking, the present invention allows the binary code to be directly edited without compromising its integrity. More specifically, one or more call instructions are used to facilitate transformation of the binary code into smaller binary code segments (i.e., shared objects) having sizes within a reference range of a control transfer function, such as a branch instruction. In one embodiment, a branch slamming operation can then used to displace a binary instruction contained within a smaller binary code segment with a branch instruction referring to a binary patch that is appended to the smaller binary code segment. The binary instruction displaced by the branch instruction is preserved in the binary patch. Upon completion of the binary patch execution, the smaller binary code segment continues executing with an instruction immediately following the branch instruction. The smaller binary code segment integrity is maintained by preserving a machine state immediately prior to the branch instruction. The transformation of the binary code into smaller binary code segments and the branch slamming operation are two distinctly different processes that can be performed independently of one another. The method for safely editing the binary code as provided by the present invention can be particularly useful for editing large binary codes having sizes that exceed the reference range of the control transfer function.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
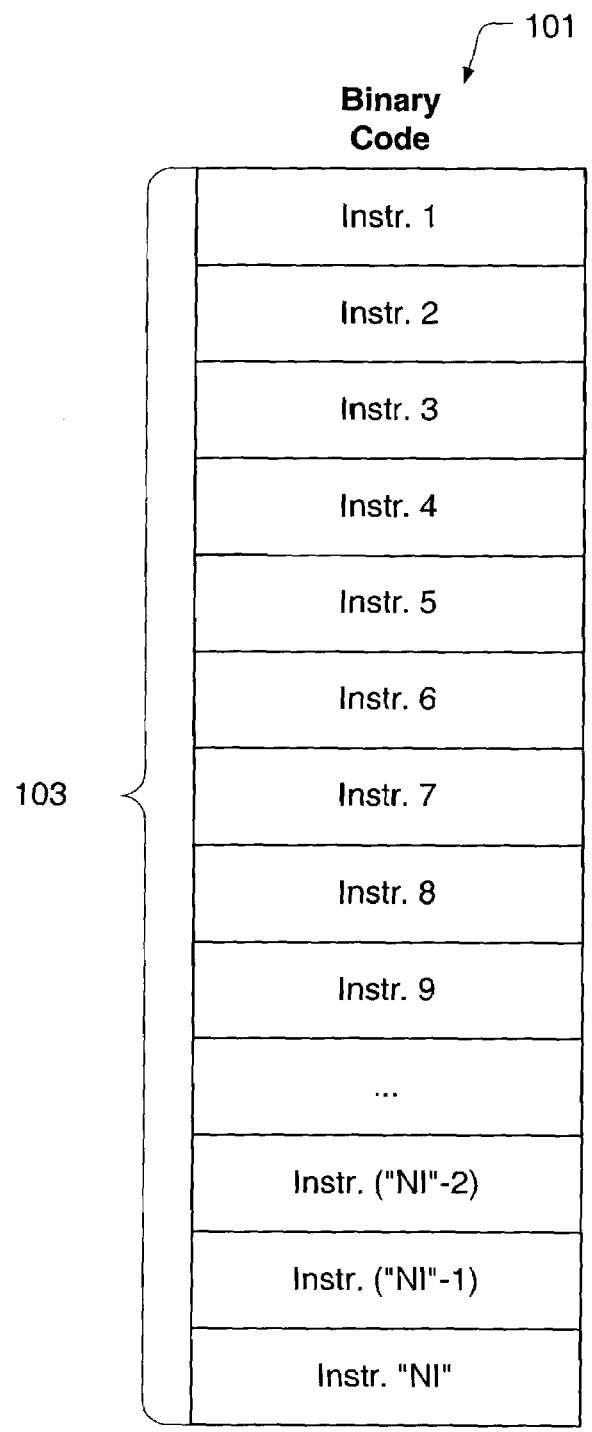
FIG. 1 is an illustration showing a binary code, in accordance with an exemplary embodiment of the present invention.

FIG. 1 is an illustration showing a binary code 101, in accordance with an exemplary embodiment of the present invention. The binary code 101 includes a number of instructions 103. The number of instructions 103 is a contiguous sequence of instructions extending from a first instruction, Instr. 1, to a final instruction, Instr. "NI", where "NI" represents a total number of instructions in the binary code.

An occasion may arise in which the binary code 101 needs to be directly modified. A direct modification of the binary code 101 may constitute replacement of one or many instructions. For example, there may be a desire to insert instructions to facilitate debugging. In a further example, there may be a desire to insert instructions to optimize a portion of the binary code 101. However, direct modification of the binary code 101 can be difficult and prone to introduce errors.

Some instructions in the binary code 101 represent data while other instructions control a program flow. For example, a branch instruction controls the program flow by directing execution of the binary code 101 to continue with a target instruction located elsewhere in the binary code 101. If the portion of binary code 101 to be modified contains such target instructions, modification of the binary code 101 may cause the associated branch instructions to direct execution of the binary code 101 to erroneous target instructions.

If such target instructions are known, however, they can be modified to avoid errors. Unfortunately, the entire content of the binary code 101 is generally not known when directly performing binary code 101 modifications. Thus, a potential exists for unknown branch instructions somewhere in the binary code 101 to correspond to target instructions in the portion of binary code 101 being modified.

A standard procedure for modifying the binary code 101 is to modify an original source code used to create the binary code 101 and recompile the original source code. However, there are occasions when the original source code is not available to one needing to modify the binary code 101. It is also not possible to simply spread previously existing instructions in the binary code 101 apart to make space available for instructions required by the modification. Such a rearrangement of previously existing instructions would likely render the binary code 101 inoperable. Thus, the modification must be implemented while maintaining the integrity of the binary code 101. A branch slamming operation can be used to directly modify the binary code 101 while maintaining its integrity.

Figure 2:
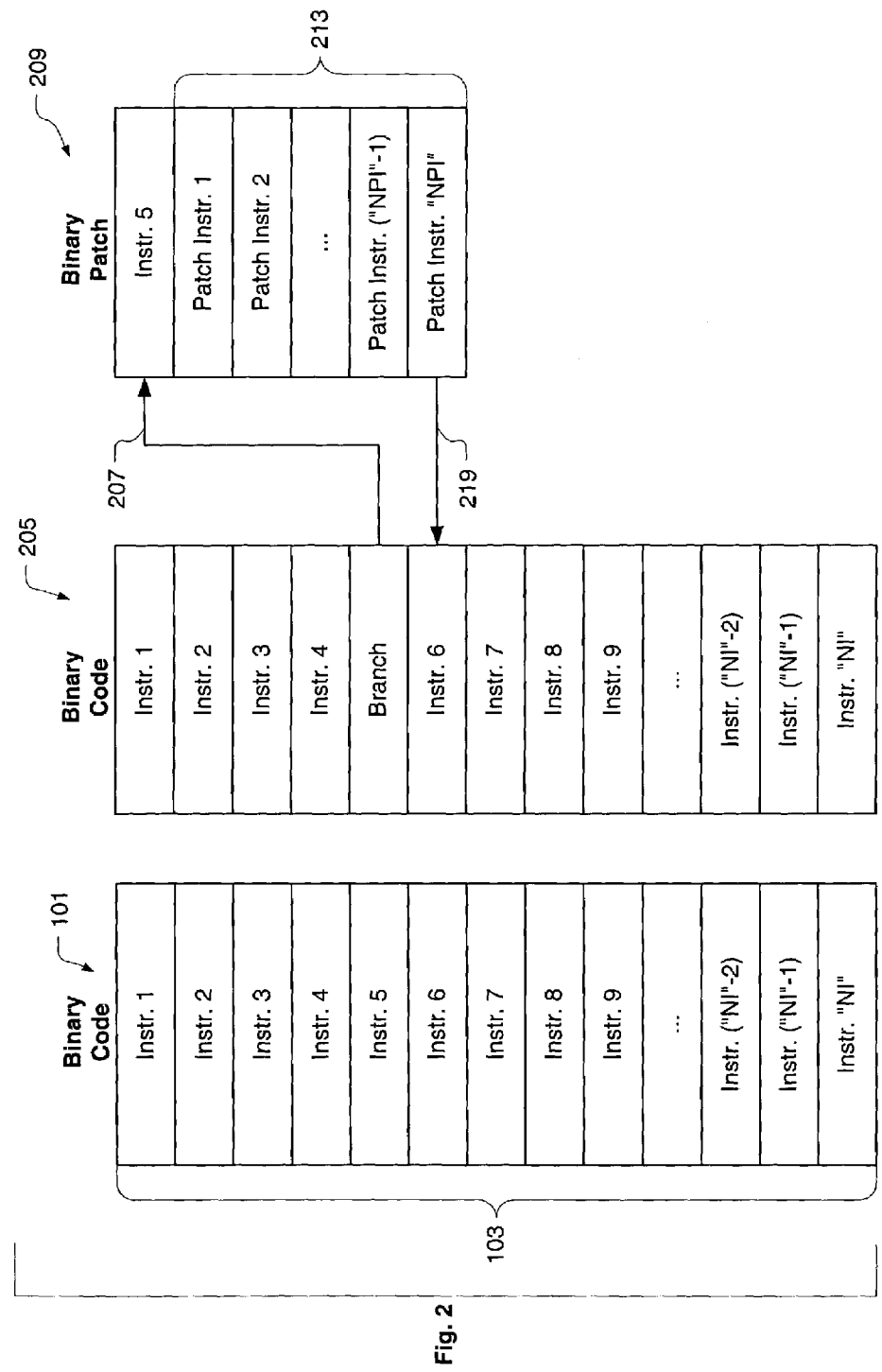
FIG. 2 is an illustration showing a branch slamming operation, in accordance with an exemplary embodiment of the present invention.

FIG. 2 is an illustration showing the branch slamming operation, in accordance with an exemplary embodiment of the present invention. The binary code 101 including the number of instructions 103 extending from Instr. 1 to Instr. "NI" is shown. A modified binary code 205 is also shown. The modified binary code 205 includes the same number of instructions 103 as the binary code 101. However, an instruction, Instr. 5, has been replaced by a branch instruction, Branch. The replacement of Instr. 5 with the Branch is an example what is termed branch slamming. Other instructions in the modified binary code 205 remain the same as in the binary code 101.

Binary codes (e.g., the binary code 101 and the modified binary code 205) have a program control to execute their instructions in a particular sequence. In general, a default for the program control is to execute instructions in the order in which they occur. However, the program control can also be directed by the instructions as they are executed. The Branch in the modified binary code 205 directs the program control to a binary patch 209 as indicated by an arrow 207.

A first instruction in the binary patch 209 is the instruction from the binary code 101 that was replaced by the Branch to create the modified binary code 205. In the example of FIG. 2, Instr. 5 is the first instruction in the binary patch 209 as it was the instruction in the binary code 101 replaced by the Branch to create the modified binary code 205. In the branch slamming operation, the instruction replaced by the Branch does not itself direct or redirect the program control. A load instruction and a store instruction are examples of instructions which do not direct or redirect the program control. As the load and store instructions are provided as examples, other instructions that do not direct or redirect the program control may also be replaced by the Branch to effect the branch slamming operation.

With respect to the example of FIG. 2, Instr. 5 does not direct or redirect the program control. Thus, in the binary code 101, the program control will continue by executing an instruction, Instr. 6, immediately following execution of Instr. 5. In following, after execution of Instr. 5 in the binary patch 209, the program control will continue by executing an instruction immediately following Instr. 5 in the binary patch 209. Hence, the binary patch 209 includes Instr. 5 followed by a number of patch instructions 213. The number of patch instructions 213 is a contiguous sequence of instructions extending from a first patch instruction, Patch Instr. 1, to a final patch instruction, Patch Instr. "NPI", where "NPI" represents a total number of patch instructions. The total number of patch instructions can be one or more instructions necessary for the binary patch 209 to perform a desired function. The final patch instruction directs the program control to execute the instruction immediately following the branch in the modified binary code 205 as indicated by an arrow 219. The program control then proceeds to execute the remainder of the modified binary code 205.

The branch slamming operation must be performed in a manner that preserves the integrity of the binary code 101. The integrity of the binary code 101 is preserved by preserving a machine state that exists prior to execution of the branch instruction. Thus, upon return of the program control from the binary patch 209, the binary code 101 will continue to execute as if the binary patch 209 was not present. Also, at least one instruction in the binary code 101 must be known to implement the branch slamming operation. In general, it is not necessary to know or understand other aspects of the binary code 101 beyond those involved in the branch slamming operation.

Figure 3:
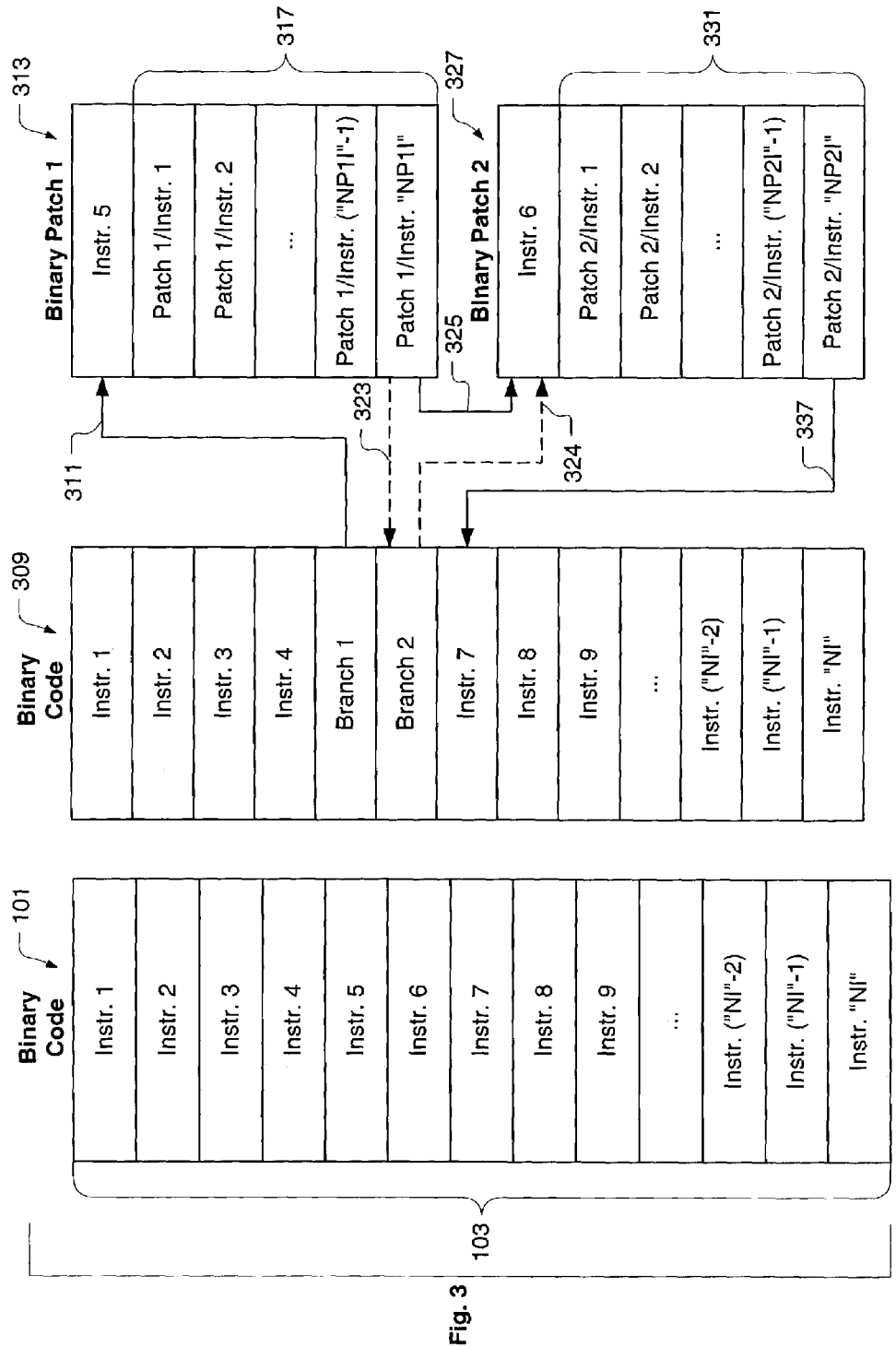
FIG. 3 is an illustration showing a branch slamming operation incorporating two successive branches, in accordance with an exemplary embodiment of the present invention.

FIG. 3 is an illustration showing a branch slamming operation incorporating two successive branches, in accordance with an exemplary embodiment of the present invention. The binary code 101 including the number of instructions 103 extending from Instr. 1 to Instr. "NI" is shown. A modified binary code 309 is also shown. The modified binary code 309 includes the same number of instructions 103 as the binary code 101. However, an instruction, Instr. 5 has been replaced by a first branch, Branch 1. Similarly, an instruction, Instr. 6, has been replaced by a second branch, Branch 2. Thus, the replacement of Instr. 5 and Instr. 6 with Branch 1 and Branch 2, respectively, represents the branch slamming operation incorporating two successive branches. Other instructions in the modified binary code 309 remain the same as in the binary code 101.

Branch 1 in the modified binary code 309 directs the program control to a first binary patch 313 as indicated by an arrow 311. A first instruction in the first binary patch 313 is Instr. 5 from the binary code 101 that was replaced by Branch 1. With respect to the example of FIG. 3, Instr. 5 does not direct or redirect the program control. Thus, after execution of Instr. 5 in the first binary patch 313, the program control directs the execution of an instruction immediately following Instr. 5 in the first binary patch 313. Hence, the first binary patch 313 includes Instr. 5 followed by a number of first patch instructions 317.

The number of first patch instructions 317 is a contiguous sequence of instructions extending from a first patch instruction, Patch 1/Instr. 1, to a final patch instruction, Patch 1/Instr. "NP1I", where "NP1I" represents a total number of first patch instructions. The final patch instruction generally directs the program control to execute the instruction immediately following Branch 1 in the modified binary code 309 as indicated by an arrow 323.

The instruction immediately following Branch 1 in the modified binary code 309 is Branch 2. Branch 2 directs the program control to a second binary patch 327 as indicated by an arrow 324. Since Branch 1 and Branch 2 occur successively in the modified binary code 309, the program control can be optimized by defining the final patch instruction, Patch 1/Instr. "NP1I", of the first binary patch 313 to direct the program control to the second binary patch 327 as indicated by an arrow 325.

A first instruction in the second binary patch 327 is Instr. 6 from the binary code 101 that was replaced by Branch 2. With respect to the example of FIG. 3, Instr. 6 does not direct or redirect the program control. Thus, after execution of Instr. 6 in the second binary patch 327, the program control directs the execution of an instruction immediately following Instr. 6 in the second binary patch 327. Hence, the second binary patch 327 includes Instr. 6 followed by a number of second patch instructions 331.

The number of second patch instructions 331 is a contiguous sequence of instructions extending from a first patch instruction, Patch 2/Instr. 1, to a final patch instruction, Patch 2/Instr. "NP2I", where "NP2I" represents a total number of second patch instructions. The final patch instruction directs the program control to execute the instruction immediately following Branch 2 in the modified binary code 309 as indicated by an arrow 337. The program control then proceeds to execute the remainder of the modified binary code 309.

Figure 4:
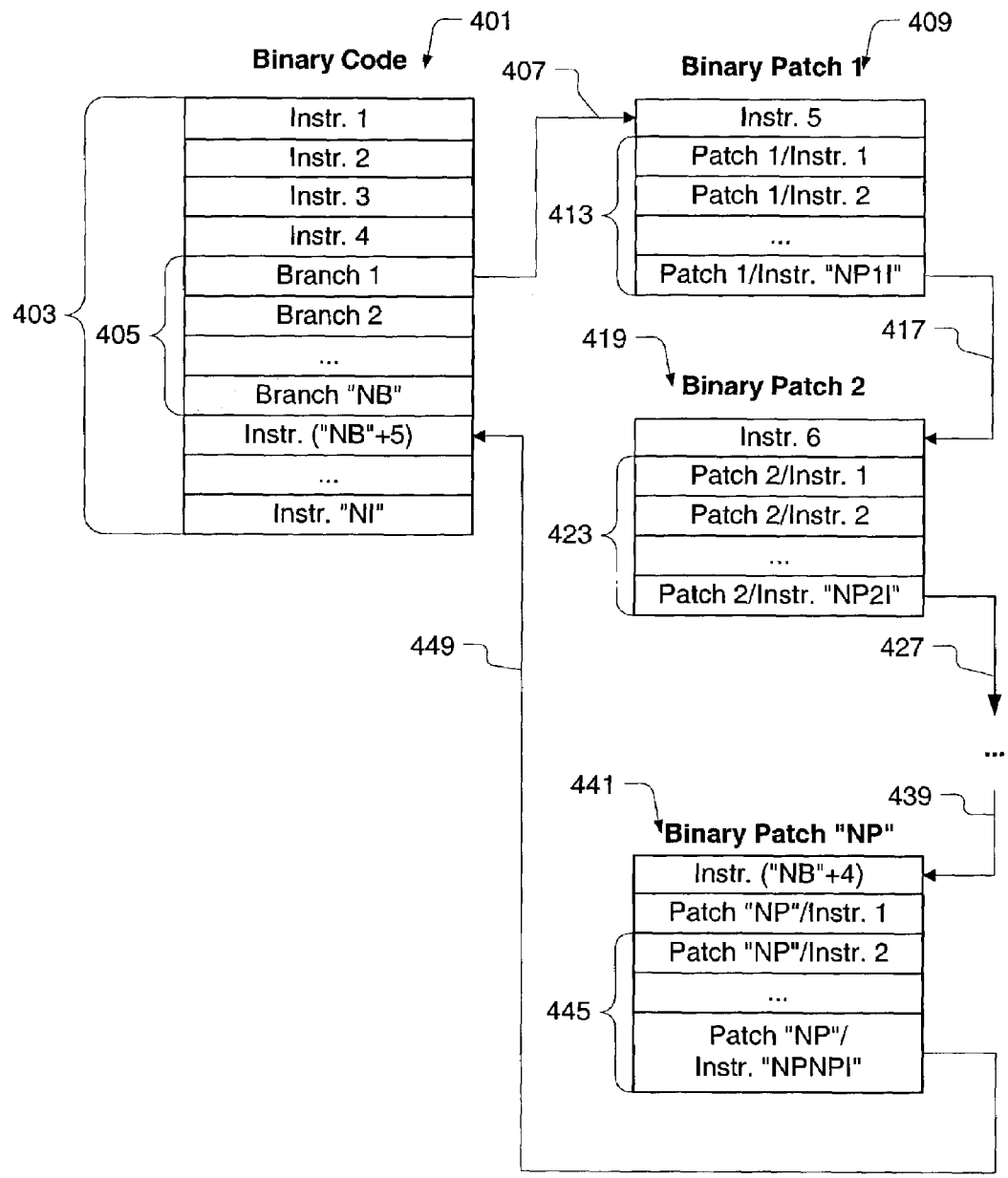
FIG. 4 is an illustration showing a branch slamming operation incorporating a number of successive branches, in accordance with an exemplary embodiment of the present invention.

FIG. 4 is an illustration showing a branch slamming operation incorporating a number of successive branches, in accordance with an exemplary embodiment of the present invention. A modified binary code 401 including a number of instructions 403 extending from Instr. 1 to Instr. "NI" is shown, where "NI" represents a total number of instructions. A number of instructions following an instruction, Instr. 4, are replaced by a number of successive branches 405. The number of successive branches 405 extends from a first branch, Branch 1, to a final branch, Branch "NB", where "NB" represents a total number of branches. Branch 1 in the modified binary code 401 directs the program control to a first binary patch 409 as indicated by an arrow 407.

A first instruction in the first binary patch 409 is Instr. 5 from the modified binary code 401 that was replaced by Branch 1. With respect to the example of FIG. 4, Instr. 5 does not direct or redirect the program control. Thus, after execution of Instr. 5 in the first binary patch 409, the program control directs the execution of an instruction immediately following Instr. 5 in the first binary patch 409. Hence, the first binary patch 409 includes Instr. 5 followed by a number of first patch instructions 413. The number of first patch instructions 413 is a contiguous sequence of instructions extending from a first patch instruction, Patch 1/Instr. 1, to a final patch instruction, Patch 1/Instr. "NP1I", where "NP1I" represents a total number of first patch instructions. The final patch instruction, Patch 1/Instr. "NP1I", directs the program control to a second binary patch 419 as indicated by an arrow 417.

A first instruction in the second binary patch 419 is Instr. 6 from the modified binary code 401 that was replaced by Branch 2. With respect to the example of FIG. 4, Instr. 6 does not direct or redirect the program control. Thus, after execution of Instr. 6 in the second binary patch 419, the program control directs the execution of an instruction immediately following Instr. 6 in the second binary patch 419. Hence, the second binary patch 419 includes Instr. 6 followed by a number of second patch instructions 423. The number of second patch instructions 423 is a contiguous sequence of instructions extending from a first patch instruction, Patch 2/Instr. 1, to a final patch instruction, Patch 2/Instr. "NP2I", where "NP2I" represents a total number of second patch instructions. The final patch instruction directs the program control to execute a first instruction in a subsequently occurring patch as indicated by an arrow 427.

The subsequently occurring patch corresponds to a subsequently occurring branch in the modified binary code 401. The program control proceeds with execution of the subsequently occurring patch. The final patch instruction in the subsequently occurring patch directs the program control to execute a first instruction in yet another subsequently occurring patch. This process continues until the program control is directed to a first instruction in a final binary patch 441, as indicated by an arrow 439.

For purposes of illustration in FIG. 4, the final binary patch 441 is designated as Binary Patch "NP", where "NP" represents a total number of binary patches. The total number of binary patches is equivalent to the total number of branches (i.e., "NP"="NB"). As with the previously occurring binary patches, a first instruction in the final binary patch 441 corresponds to an instruction, Instr. ("NB"+4), in the modified binary code 401 that was replaced by the final branch, Branch "NB", associated with the final binary patch 441. With respect to the example of FIG. 4, Instr. ("NB"+4) does not direct or redirect the program control. Thus, after execution of Instr. ("NB"+4) in the final binary patch 441, the program control directs the execution of an instruction immediately following Instr. ("NB"+4) in the final binary patch 441. Hence, the final binary patch 441 includes Instr. ("NB"+4) followed by a number of final patch instructions 445. The number of final patch instructions 445 is a contiguous sequence of instructions extending from a first patch instruction, Patch "NP"/Instr. 1, to a final patch instruction, Patch "NP"/Instr. "NPNPI", where "NPNPI" represents a total number of final patch instructions. The final patch instruction, Patch "NP"/Instr. "NPNPI", directs the program control to execute the instruction immediately following the final branch, Branch "NB", in the modified binary code 401 as indicated by an arrow 449. The program control then proceeds to execute the remainder of the modified binary code 401.

Figure 5:
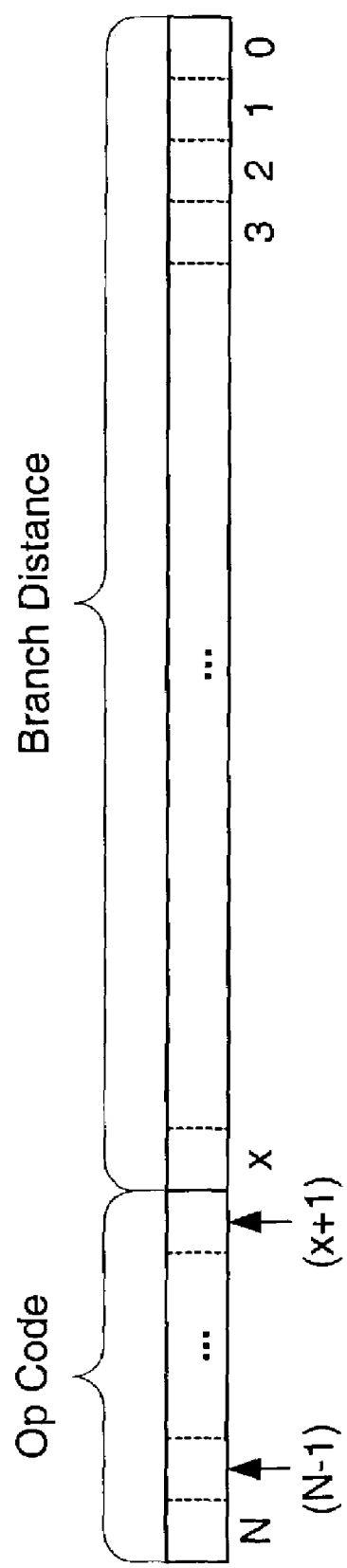
FIG. 5 is an illustration showing a branch instruction format, in accordance with an embodiment of the present invention.

FIG. 5 is an illustration showing a branch instruction format, in accordance with an embodiment of the present invention. The branch instruction format is defined by N bits, wherein a bit-0 is a least significant bit and a bit-N is a most significant bit. A branch distance is defined using bits 0 through x. The branch distance is used to identify a next address to be executed by the program control. Thus, the branch distance represents the distance from the branch instruction to the next address to be executed. The branch instruction format also includes an op code defined using bits (x+1) through N. In general, the op code is used to identify an operation to be performed by an instruction. In the case of the branch instruction, the op code identifies that a branching operation is to be performed.

Figure 6:
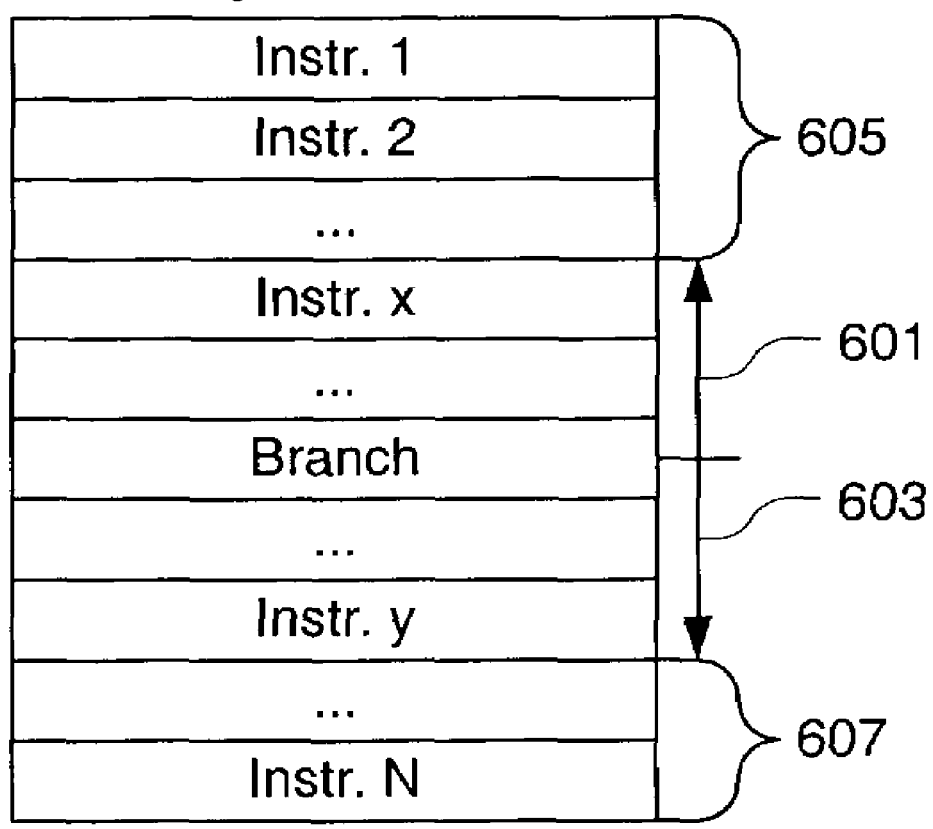
FIG. 6 is an illustration showing a sequence of binary instructions including an inserted branch instruction, in accordance with an embodiment of the present invention.

FIG. 6 is an illustration showing a sequence of binary instructions including an inserted branch instruction, in accordance with an embodiment of the present invention. The sequence of binary instructions include Instr. 1 through Instr. N. The inserted branch instruction is depicted by Branch. Since the branch format includes a definite number of bits to represent the branch distance, it follows that the branch distance has an upper limit. The upper limit of the branch distance is referred to as a branch scope. With respect to FIG. 6, the branch scope extends in one direction to Instr. x as shown by an arrow 601. The branch scope also extends in another direction to Instr. y as shown by an arrow 603. Therefore, the branch instruction is capable of directing the program control to a binary instruction within the branch scope extending from Instr. x through Instr. y. A group of binary instructions 605 existing prior to Instr. x and a group of binary instructions 607 existing beyond Instr. y are not within the branch scope. Therefore, the branch instruction cannot be used to direct the program control to a binary instruction within the groups of binary instructions 605 or 607. Thus, there is a need for a method for safely instrumenting a large binary code (i.e., a binary code having a size greater than the branch scope), wherein instrumenting refers generally to editing and/or patching.

Figure 7:
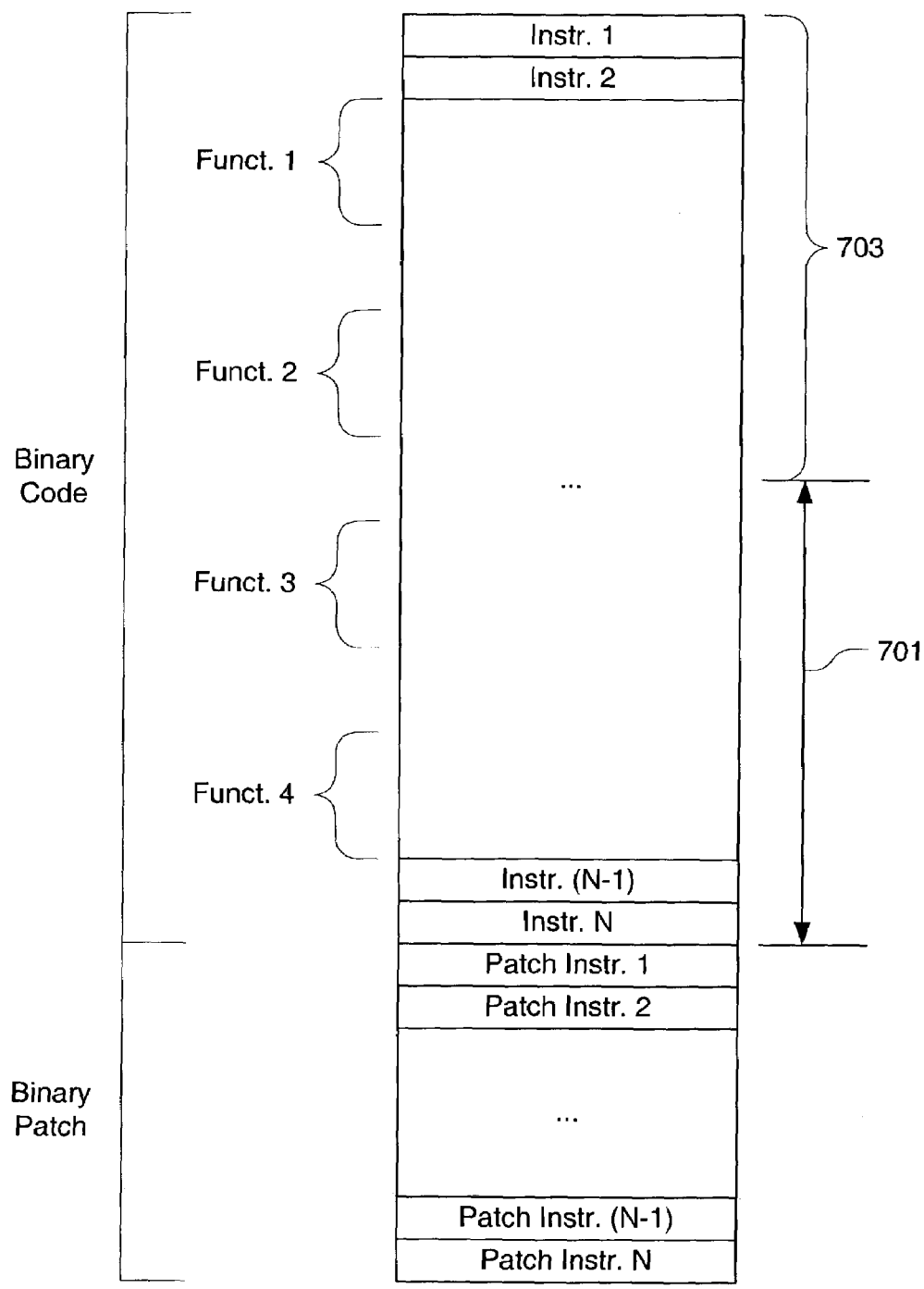
FIG. 7 is an illustration showing a binary code and an appended binary patch, in accordance with an embodiment of the-present invention.

FIG. 7 is an illustration showing a binary code and an appended binary patch, in accordance with an embodiment of the present invention. The binary code includes a number of functions identified as Funct. 1, Funct. 2, Funct. 3, and Funct. 4. The binary code and the number of functions are defined by a sequence of binary instructions extending from an Instr. 1 to an Instr. N. The appended binary patch is also defined by a number of binary instructions extending from an a Patch Instr. 1 to a Patch Instr. N. A branch scope 701 is shown adjacent to the binary code. The branch scope 701 is limited such that the program control cannot be directed to the appended binary patch from a branch instruction within a range 703. Thus, FIG. 7 represents a situation in which a method for safely instrumenting a large binary code as provided by the present invention would be useful.

Figure 8:
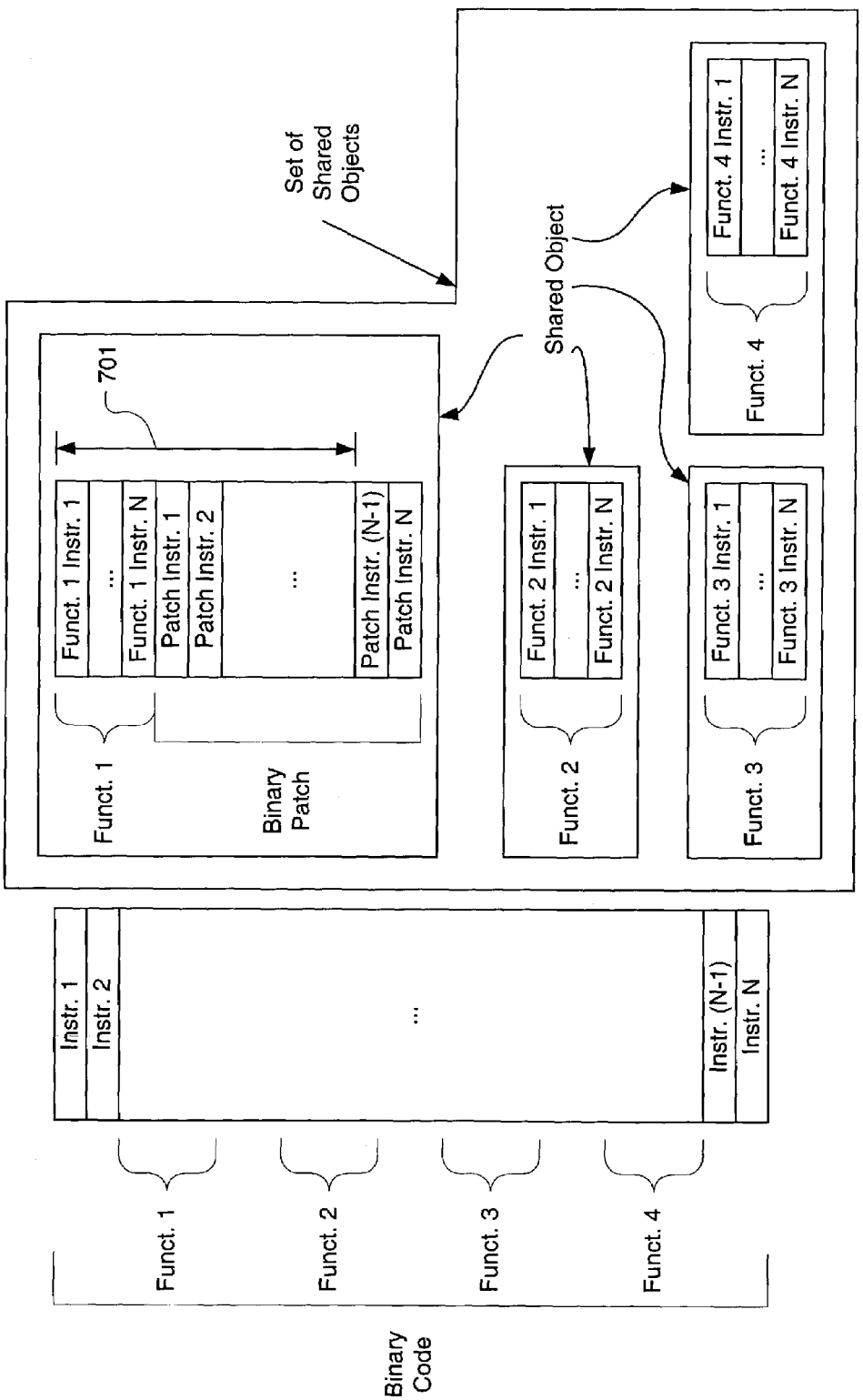
FIG. 8 is an illustration showing a transformed representation of the binary code and the appended binary patch from FIG. 7, in accordance with an embodiment of the present invention.

FIG. 8 is an illustration showing a transformed representation of the binary code and the appended binary patch from FIG. 7, in accordance with an embodiment of the present invention. Each function is defined by a function body having an initial instruction and final instruction. A function body for Funct. 1 extends from an initial instruction Funct. 1 Instr. 1 to a final instruction Funct. 1 Instr. N. A function body for Funct. 2 extends from an initial instruction Funct. 2 Instr. 1 to a final instruction Funct. 2 Instr. N. A function body for Funct. 3 extends from an initial instruction Funct. 3 Instr. 1 to a final instruction Funct. 3 Instr. N. A function body for Funct. 4 extends from an initial instruction Funct. 4 Instr. 1 to a final instruction Funct. 4 Instr. N. The transformed representation of the binary code is created by copying each function body into a shared object at a new location in memory. A number of function bodies can be copied to create a set of shared objects. The binary code can contain one or more call instructions that refer to the function body copied to the shared object. After copying the function body to the shared object, a number of call instructions in the binary code that refer to the function are modified to refer to the newly created shared object into which the referenced function body is copied. Hence, in the transformed representation of the binary code, each call instruction directs the program control to the initial instruction in the newly created shared object containing the previously referenced function body. As with the branch instruction, the call instruction has a definite scope. However, the call instruction scope is generally much larger than the branch instruction scope. Thus, the binary code is instrumented by using call instruction execution redirection to the newly created shared objects.

A binary patch can be placed at a location in memory such that it is appended to a shared object from which it is referenced by a branch instruction. In the example of FIGS. 7 and 8, the appended binary patch is referenced by a branch instruction within Funct. 1. Therefore, the appended binary patch is placed in memory such that it is appended to the shared object containing Funct. 1. Consequently, the binary code transformation as illustrated in FIG. 8 facilitates appending the binary patch directly to the function (i.e., shared object) from which it is referenced. Thus, the binary code transformation serves to position the appended binary patch closer to the branch instruction from which it is referenced. In following, the binary code transformation can be used to position the appended binary patch within the branch scope. With respect to FIG. 7, the branch scope 701 is limited such that the program control cannot be directed from the branch instruction within Funct. 1 in the binary code to the appended binary patch. However in the transformed representation of the binary code as shown in FIG. 8, the binary patch can be appended directly to the shared object containing Funct. 1. Thus, the binary patch can be placed within the branch scope 701 extending from the branch instruction within Funct. 1 as contained in the shared object.

Generally, each shared object in the set of shared objects occupies an amount of memory that is not larger than the branch scope minus a memory size needed to define the binary patch. Therefore, each shared object can be instrumented easily since its size is within the branch scope. While the binary code transformation has been described in the context of supporting a branch slamming operation, it should be understood that the binary code transformation can be performed independently from (i.e., without) an accompanying branch slamming operation. Furthermore, while the present invention has been shown to be particularly important for safely instrumenting large binary codes, it should be understood that the present invention can be equally applied to binary codes of any size.

FIG. 9 is an illustration showing an address map 901 for a binary code transformation, in accordance with an embodiment of the present invention. The address map 901 represents a tool for correlating an address of a function body in an original binary code to an address of a shared object containing a copy of the function body as created during the binary code transformation. The address map 901 is shown to contain address correlations for functions 1 through "NF", where "NF" represents a total number of functions contained within the original binary code. For each function, the address map 901 contains a beginning address of the function in the original binary code. Also for each function, the address map 901 contains a beginning address of the shared object containing the copy of the function as created during the binary code transformation. During the binary code transformation, each call instruction referring to a given function is modified to refer to the beginning address of the shared object into which the given function is copied. In this manner, each call instruction directs the program control to the address of the newly created shared object for each function.

Figure 10:
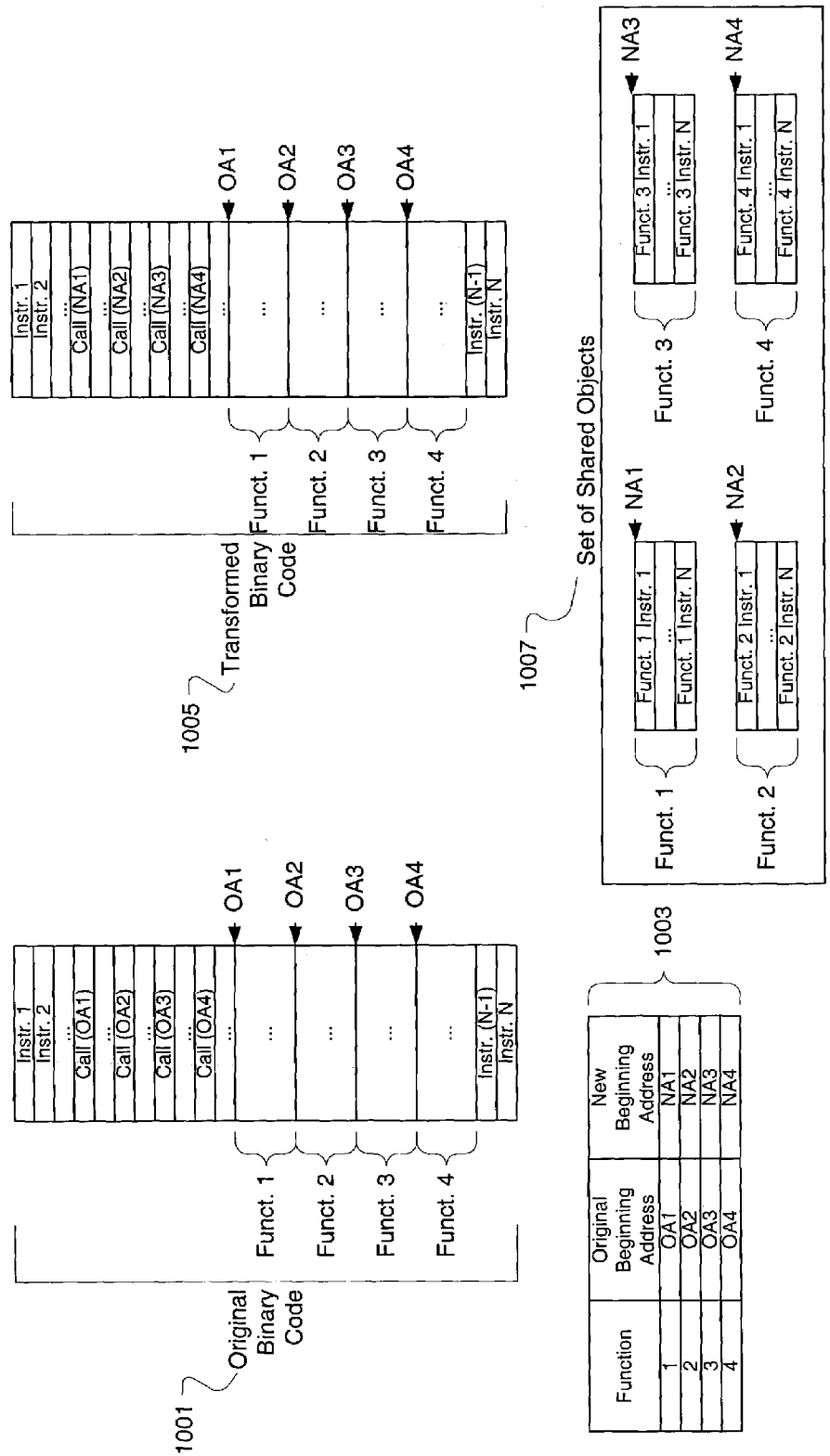
FIG. 10 is an illustration showing an example of a binary code transformation, in accordance with an embodiment of the present invention.

FIG. 10 is an illustration showing an example of a binary code transformation, in accordance with an embodiment of the present invention. An original binary code 1001 includes a number of instructions extending from an instruction Instr. 1 to an instruction Instr. N. Within the original binary code 1001, a number of functions are defined. The number of functions include a function Funct. 1, a function Funct. 2, a function Funct. 3, and a function Funct. 4. An address is associated with an initial instruction of each function in the original binary code 1001. The addresses OA1, OA2, OA3, and OA4 correspond to the initial instructions of Funct. 1, Funct. 2, Funct. 3, and Funct. 4, respectively. An address map 1003 is created to correlate the addresses OA1, OA2, OA3, and OA4 to a set of new addresses associated with a set of shared objects 1007 created during the binary code transformation. During the binary code transformation, each function is copied to a newly created shared object at a new location in memory. The initial instructions of Funct. 1, Funct. 2, Funct. 3, and Funct. 4 are placed at new addresses NA1, NA2, NA3, and NA4, respectively, corresponding to the beginning addresses of each shared object. The new shared object beginning addresses NA1, NA2, NA3, and NA4 are appropriately placed in the address map 1003. As shown in a transformed binary code 1005, each call instruction in the original binary code 1001 is modified to refer to the beginning address of the shared object containing the copy of the originally referenced function (i.e., Call (OA1) modified to Call (NA1), Call (OA2) modified to Call (NA2), Call (OA3) modified to Call (NA3), Call (OA4) modified to Call (NA4)).

Figure 11:
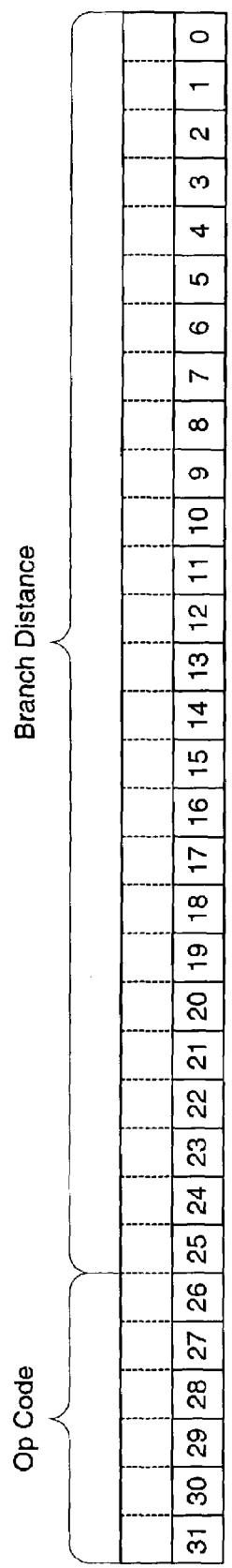
FIG. 11 is an illustration showing a branch instruction format for use in a 32-bit SPARC computer architecture, in accordance with an embodiment of the present invention.

FIG. 11 is an illustration showing a branch instruction format for use in a 32-bit SPARC computer architecture, in accordance with an embodiment of the present invention. The branch instruction format is defined by 32 bits, wherein a bit-0 is a least significant bit and a bit-31 is a most significant bit. A 26-bit branch scope is defined using bits 0 through 25. The 26-bit branch scope is generally capable of defining a maximum branch distance of about 8 MB (megabytes). Therefore, the distance in memory between a branch instruction and a corresponding binary patch should be less than about 8 MB when implementing branch slamming on the 32-bit SPARC computer architecture. If a distance between the branch instruction and the corresponding binary patch (to be appended to the end of the binary code) is larger than about 8 MB, the binary code can be transformed in accordance with the present invention to allow the branch slamming operation to be performed. In addition to the 26-bit branch scope, the branch instruction format for use in the 32-bit SPARC computer architecture also includes a 6-bit op code defined using bits 26 through 31. In general, the op code is used to identify an operation to be performed by an instruction. In the case of the branch instruction, the op code identifies that a branching operation is to be performed.

Figure 12:
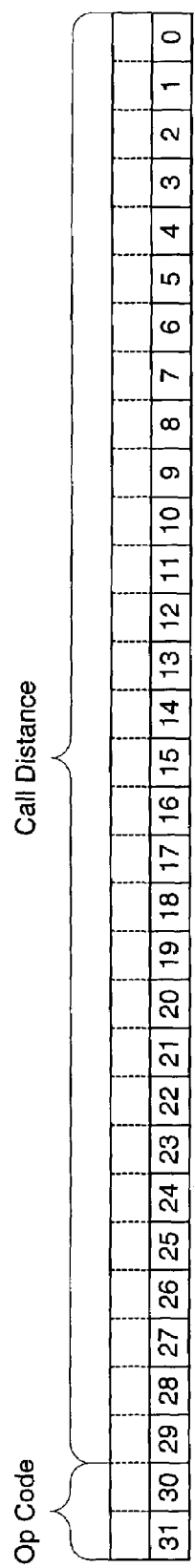
FIG. 12 is an illustration showing a call instruction format for use in a 32-bit SPARC computer architecture, in accordance with an embodiment of the present invention.

FIG. 12 is an illustration showing a call instruction format for use in a 32-bit SPARC computer architecture, in accordance with an embodiment of the present invention. The call instruction format is defined by 32 bits, wherein a bit-0 is a least significant bit and a bit-31 is a most significant bit. A 30-bit call scope is defined using bits 0 through 29. The 30-bit call scope is generally capable of defining a maximum call distance of about 4 GB (gigabytes). Therefore, the distance in memory between a call instruction and a shared object containing a copy of the referenced function should be less than about 4 GB when implementing the binary code transformation of the present invention on the 32-bit SPARC computer architecture. In addition to the 30-bit call scope, the call instruction format for use in the 32-bit SPARC computer architecture also includes a 2-bit op code defined using bits 30 and 31. As previously mentioned, the op code is used to identify an operation to be performed by an instruction. In the case of the call instruction, the op code identifies that a call operation is to be performed.

Figure 13:
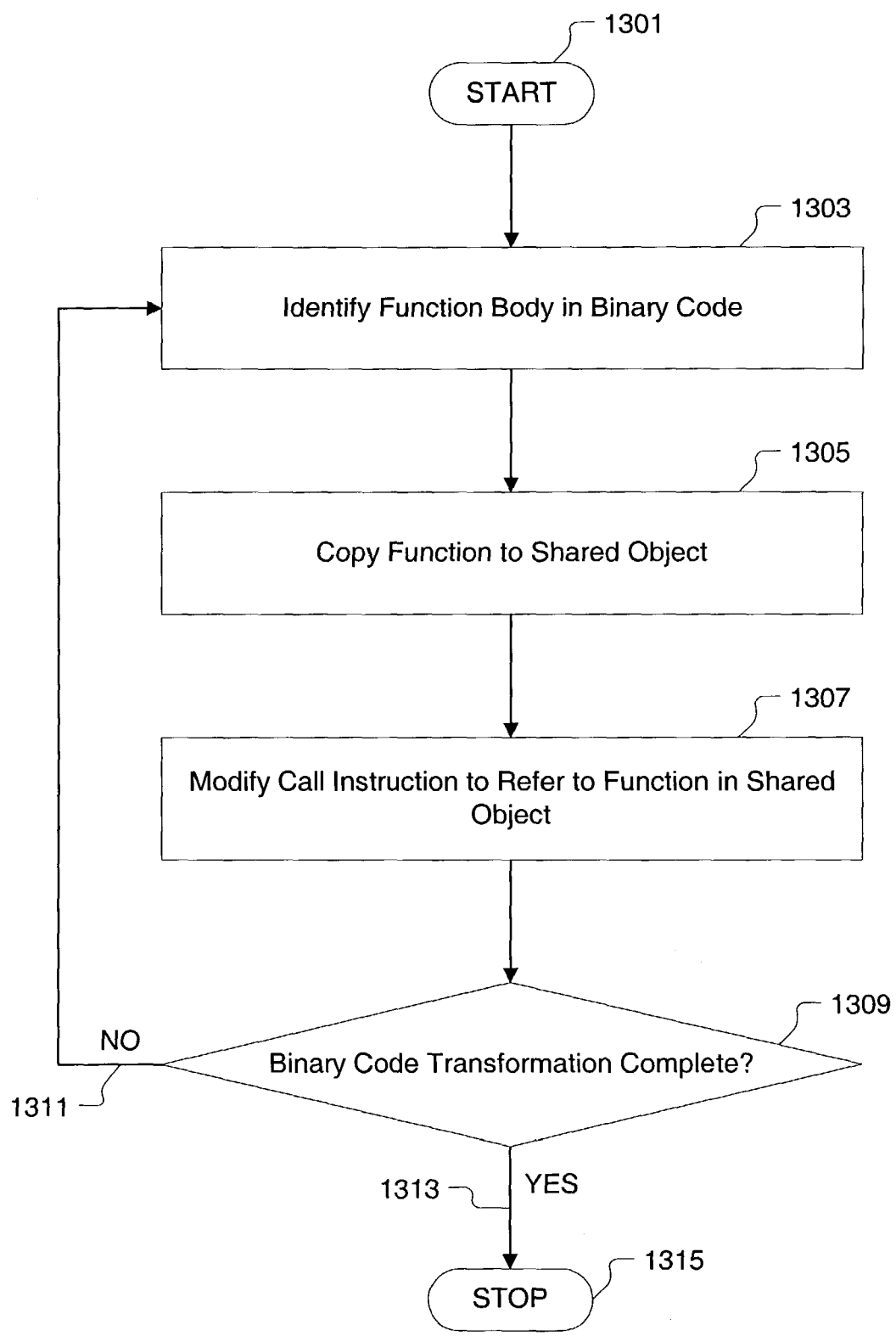
FIG. 13 shows a flowchart illustrating a method for transforming a binary code, in accordance with one embodiment of the present invention.

FIG. 13 shows a flowchart illustrating a method for transforming a binary code, in accordance with one embodiment of the present invention. The method begins at a start block 1301. The method includes an operation 1303 for identifying a function body in the binary code. The binary code includes a plurality of binary instructions. The plurality of binary instructions occupy a memory of a computer system and are executable by circuitry of the computer system. The function body in the binary code is defined by a sequence of instructions extending from an initial memory address to a final memory address. The sequence of instructions defining the function body may be positioned at an arbitrary location within the plurality of instructions included in the binary code.

The method further includes an operation 1305 for copying the function body into a shared object. The function body is copied from the binary code such that the sequence of instructions defining the function body will define a shared object extending from a new initial memory address to a new final memory address. The new initial memory address and the new final memory address are located outside of the memory occupied by the binary code.

The method further includes an operation 1307 for modifying one or more call instructions in the binary code, wherein the call instructions refer to the function copied from the binary code into the shared object. Each call instruction is modified to direct a program control to the new initial memory address corresponding to the shared object into which the corresponding function is copied. Upon completion of an execution of the function in the shared object, the call instruction directs the program control to return from the shared object back to the binary code.

The method further includes a decision operation 1309 for determining whether transformation of the binary code is complete. If a desired number of function bodies have been copied from the binary code into shared objects, the method proceeds to a stop block 1315 as indicated by an arrow 1313. If more function bodies are to be copied from the binary code into shared objects, the method proceeds back to operation 1303 as indicated by an arrow 1311. The method then continues through operations 1303, 1305, and 1307 until the decision operation 1309 is reached again and reperformed.

Figure 14:
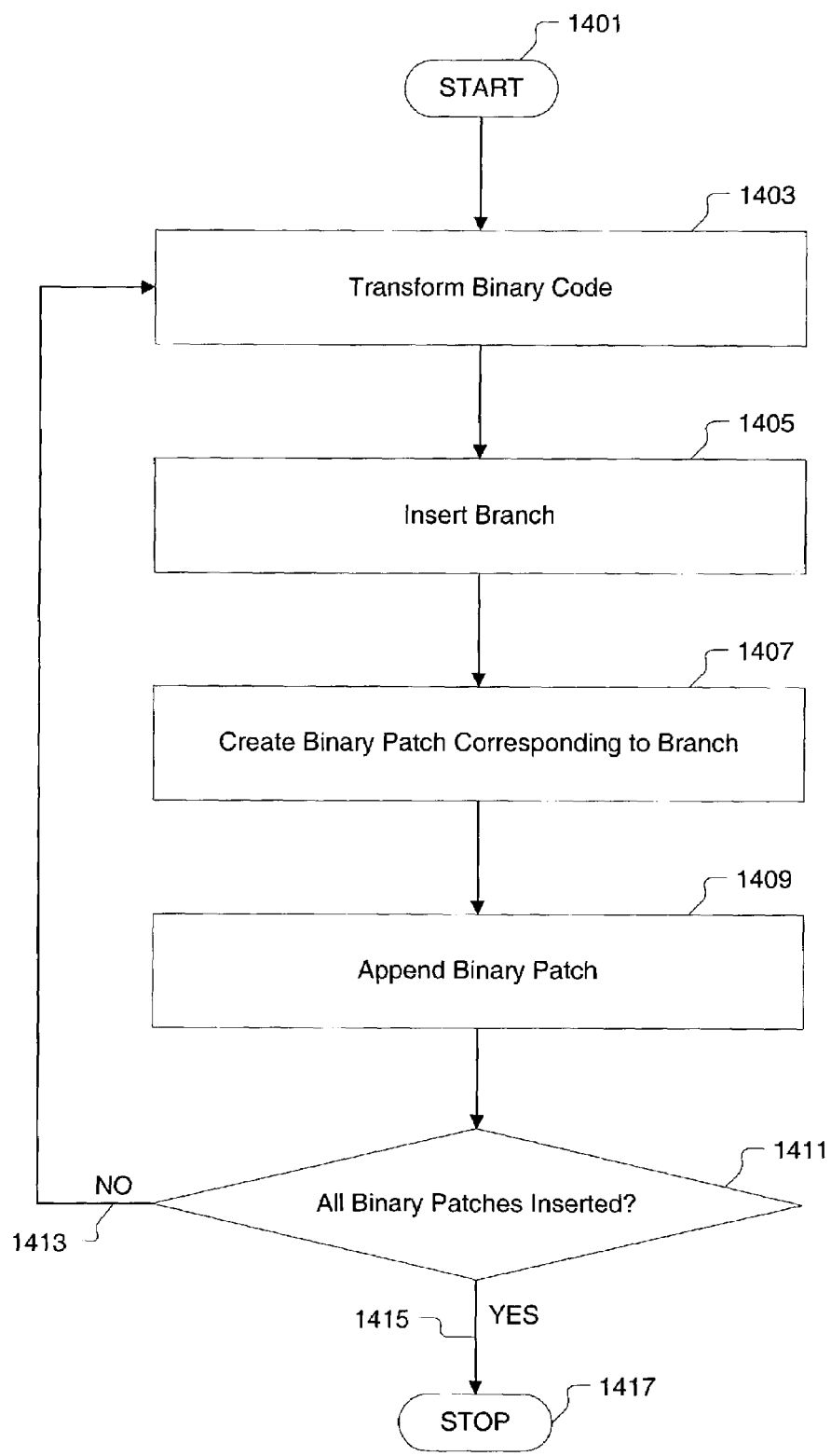
FIG. 14 shows a flowchart illustrating a method for editing a binary code, in accordance with one embodiment of the present invention.

FIG. 14 shows a flowchart illustrating a method for editing a binary code, in accordance with one embodiment of the present invention. The method begins at a start block 1401. The method includes an operation 1403 for transforming the binary code into a plurality of binary code segments. The binary code includes a plurality of binary instructions. The plurality of binary instructions occupy a memory of a computer system and are executable by circuitry of the computer system. Transforming the binary code includes identifying one or more function bodies in the binary code. Each of the one or more function bodies represents a binary code segment including a separate sequence of instructions extending from a corresponding initial memory address to a corresponding final memory address. In addition to identifying the function bodies, transforming the binary code also includes copying each of the one or more functions from the binary code into a newly created shared object, wherein each function is copied into a separate shared object. Copying a particular function includes copying the separate sequence of instructions associated with the particular function body such that the separate sequence of instructions extends from a new corresponding initial memory address to a new corresponding final memory address within the shared object. Transforming the binary code also includes modifying one or more call instructions in the binary code such that each call instruction refers to the shared object containing the copy of the previously referenced function. Each call instruction is configured to direct a program control to the function contained within the referenced shared object. Each call instruction is also configured to direct the program control back to the binary code upon completion of an execution of the function within the shared object referenced by the call instruction.

The method further includes an operation 1405 for inserting a branch instruction into at least one of the plurality of binary code segments. Inserting the branch instruction includes identifying an instruction in a binary code segment to be replaced by the branch instruction. In one embodiment, the binary code segment can be a shared object into which a function is copied from the binary code. Inserting the branch instruction also includes replacing the identified instruction in the binary code segment with the branch instruction. The branch instruction is configured to direct the program control to a binary patch appended to the binary code segment. Replacement of the instruction in the binary code segment with the branch instruction is performed without recompiling an original source code, wherein the original source code was used to create the binary code segment. Also, replacement of the instruction in the binary code segment with the branch instruction is performed such that a machine state is preserved. The machine state includes a plurality of register values and data existing immediately prior to an execution of the branch instruction.

The method further includes an operation 1407 for creating a binary patch to correspond to the branch instruction. The binary patch includes a number of supplemental instructions to be included in the binary code segment associated with the branch instruction. Creating the binary patch includes defining a first instruction in the binary patch to be the instruction in the binary code segment replaced with the branch instruction. Creating the binary patch also includes defining a last instruction in the binary patch to direct the program control to a subsequent instruction in the binary code segment. The subsequent instruction in the binary code segment immediately follows the instruction replaced with the branch instruction. The method further includes an operation 1409 for appending the binary patch to the binary code segment into which the branch instruction is inserted.

The method further includes a decision operation 1411 for determining whether all desired binary patch insertions have been completed. If a desired number of binary patches have been inserted, the method proceeds to a stop block 1417 as indicated by an arrow 1415. If more binary patches are to be inserted, the method proceeds back to operation 1403 as indicated by an arrow 1413. The method then continues through operations 1403, 1405, 1407, and 1409 until the decision operation 1411 is reached again and reperformed.

Figure 15:
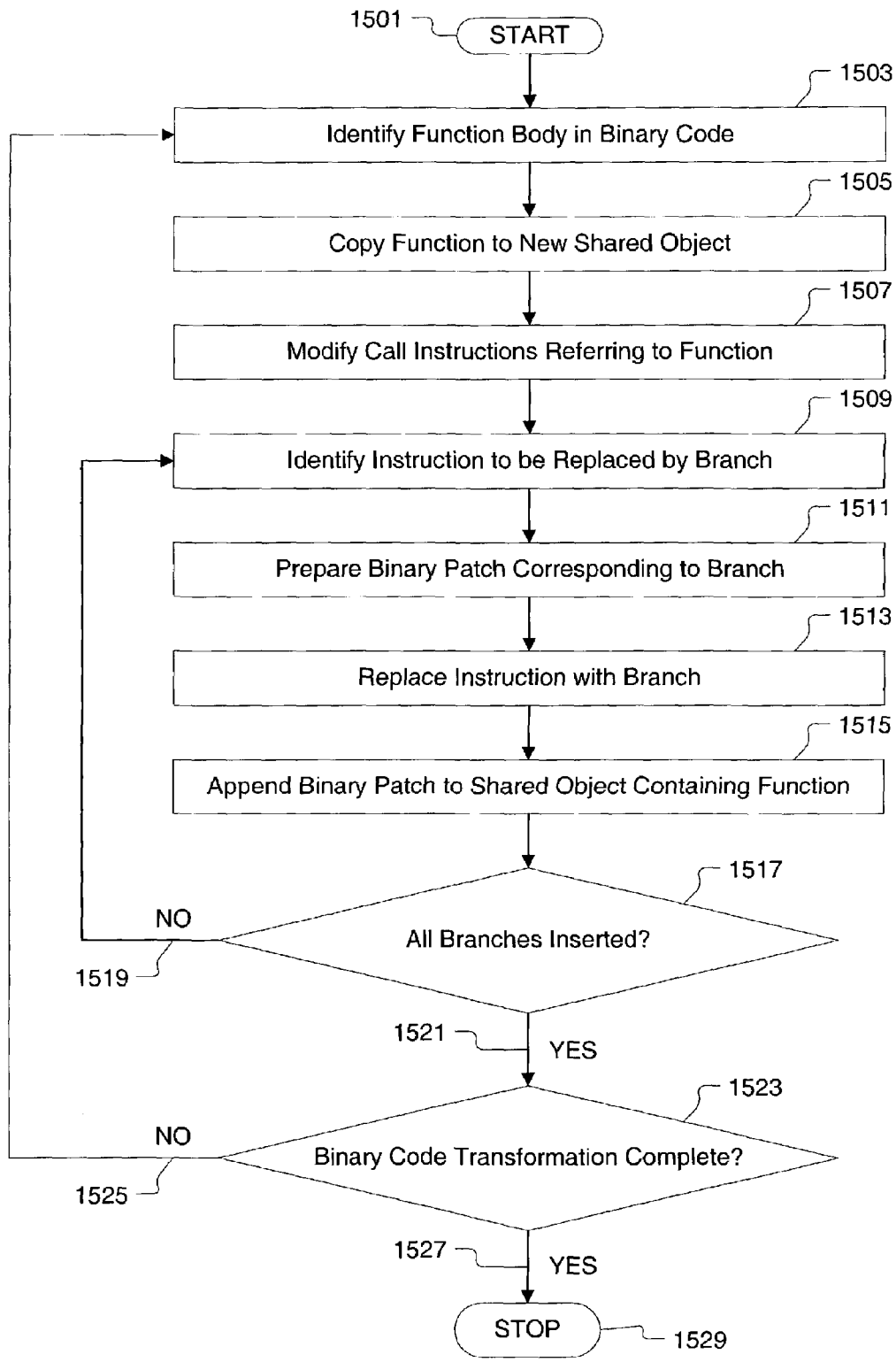
FIG. 15 shows a flowchart illustrating a method for performing a combined transformation and branch slamming operation on a binary code, in accordance with one embodiment of the present invention.

FIG. 15 shows a flowchart illustrating a method for performing a combined transformation and branch slamming operation on a binary code, in accordance with one embodiment of the present invention. The method begins at a start block 1501. The method includes an operation 1503 for identifying a function body in the binary code. The binary code includes a plurality of binary instructions. The plurality of binary instructions occupy a memory of a computer system and are executable by circuitry of the computer system. The function body to be identified in operation 1503 is defined by a sequence of instructions extending from an initial memory address to a final memory address.

The method further includes an operation 1505 for copying the function from the binary code to a newly created shared object. Copying the function includes copying the sequence of instructions defining the function body such that the sequence of instructions extends from an initial memory address of the shared object to a final memory address of the shared object.

The method further includes an operation 1507 for modifying call instructions that refer to the function body copied to the shared object. The call instructions to be modified are located in the binary code and correspond to the function body copied from the binary code in operation 1505. The call instructions are configured to direct a program control to the initial memory address of the shared object containing the function copied from the binary code.

The method further includes an operation 1509 for identifying an instruction in the shared object, containing the function copied from the binary code, to be replaced by a branch instruction. The branch instruction is configured to direct the program control to a binary patch to be appended to the shared object.

The method further includes an operation 1511 for preparing a binary patch to correspond to the branch instruction. The binary patch contains supplemental instructions to be included in the function body. Preparing the binary patch includes defining a first instruction in the binary patch to be the instruction identified in operation 1509 to be replaced by the branch instruction. Also, preparing the binary patch includes defining a last instruction in the binary patch to direct the program control to a subsequent instruction in the shared object. The subsequent instruction in the shared object immediately follows the instruction to be replaced by the branch instruction.

The method further includes an operation 1513 for replacing the instruction in the shared object, with the branch instruction. Replacement of the instruction in the shared object with the branch instruction is performed without recompiling an original source code, wherein the original source code was used to create the function body contained within the shared object. Also, replacement of the instruction in the shared object with the branch instruction is performed such that a machine state is preserved. The machine state includes a plurality of register values and data existing immediately prior to an execution of the branch instruction. The method further includes an operation 1515 for appending the binary patch to the shared object.

The method further includes a decision operation 1517 for determining whether all desired branch instructions have been inserted. If a desired number of branch instructions have been inserted, the method proceeds to a decision operation 1523 as indicated by an arrow 1521. If more branch instructions are to be inserted, the method proceeds back to operation 1509 as indicated by an arrow 1519. The method then continues through operations 1509, 1511, 1513, and 1515 until the decision operation 1517 is reached again and reperformed.

The method further includes the decision operation 1523 for determining whether the binary code transformation is complete. If a desired number of function bodies have been copied from the binary code to respective shared objects, the method proceeds to a stop block 1529 as indicated by an arrow 1527. If more function bodies are to be copied from the binary code, the method proceeds back to operation 1503 as indicated by an arrow 1525. The method then continues through operations 1503, 1505, 1507, 1509, 1511, 1513, 1515, and decision operation 1517 until the decision operation 1523 is reached again and reperformed.

It should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A method for transforming a binary code to enable safe instrumentation of the binary code, comprising:
   identifying a function body in the binary code;
   copying the function body from the binary code to a shared object; and
   modifying a call instruction in the binary code to refer to the shared object, the call instruction previously referring to the function body in the binary code.

2. A method for transforming a binary code as recited in claim 1, wherein the binary code occupies a memory of a computer system.

3. A method for transforming a binary code as recited in claim 1, wherein the function body comprises a sequence of instructions extending from an initial memory address to a final memory address, wherein the initial memory address and the final memory address reside in a memory of a computer system.

4. A method for transforming a binary code as recited in claim 3, wherein copying the function body from the binary code to the shared object comprises copying the function body comprising the sequence of instructions extending from the initial memory address to the final memory address such that the sequence of instructions extend from a new initial memory address to a new final memory address, the new initial memory address and the new final memory address being located outside a memory of the computer system occupied by the binary code.

5. A method for transforming a binary code as recited in claim 4, wherein the call instruction is configured to direct a program control to the new initial memory address corresponding to the function body copied from the binary code to the shared object, the call instruction being further configured to direct the program control from the shared object back to the binary code upon completion of an execution of the function body copied from the binary code.

6. A method for transforming a binary code as recited in claim 1, wherein the binary code comprises a plurality of binary instructions, the plurality of binary instructions being executable by computer system circuitry.

7. A computer-implemented method for editing a binary code, comprising:
   transforming the binary code into a plurality of binary code segments including, identifying one or more function bodies in the binary code,
   copying each of the one or more function bodies from the binary code to a shared object, and
   modifying one or more call instructions in the binary code to refer to the shared object, the one or more call instructions previously referring to the one or more function bodies in the binary code;
   inserting a branch instruction into at least one of the plurality of binary code segments;
   creating a binary patch to correspond to the branch instruction; and
   appending the binary patch to the at least one of the plurality of binary code segments.

8. A method for editing a binary code as recited in claim 7, wherein the binary code occupies a memory of a computer system.

9. A method for editing a binary code as recited in claim 7, wherein each of the one or more function bodies comprise a separate sequence of instructions extending from a corresponding initial memory address to a corresponding final memory address, wherein the corresponding initial memory address and the corresponding final memory address reside in a memory of a computer system.

10. A method for editing a binary code as recited in claim 9, wherein copying each of the one or more function bodies from the binary code to the shared object comprises copying each of the one or more function bodies comprising the separate sequence of instructions extending from the corresponding initial memory address to the corresponding final memory address such that the separate sequence of instructions extend from a new corresponding initial memory address to a new corresponding final memory address, the new corresponding initial memory address and the new corresponding final memory address being located outside a memory of the computer system occupied by the binary code.

11. A method for editing a binary code as recited in claim 7, wherein each of the one or more call instructions are configured to direct a program control from the binary code to one of the one or more function bodies copied from the binary code to the shared object, each of the one or more call instructions being further configured to direct the program control from the shared object back to the binary code upon completion of an execution of the one of the one or more function bodies copied from the binary code.

12. A method for editing a binary code as recited in claim 7, wherein inserting the branch instruction into at least one of the plurality of binary code segments comprises:
   identifying an instruction in the at least one of the plurality of binary code segments; and
   replacing the instruction in the at least one of the plurality of binary code segments with the branch instruction, the branch instruction directing a program control to the binary patch.

13. A method for editing a binary code as recited in claim 12, wherein replacing the instruction in the at least one of the plurality of binary code segments with the branch instruction is performed without recompiling an original source code, the original source code having been used to create the at least one of the plurality of binary code segments.

14. A method for editing a binary code as recited in claim 12, wherein replacing the instruction in the at least one of the plurality of binary code segments with the branch instruction is performed such that a machine state is preserved, the machine state comprising a plurality of register values and data existing immediately prior to an execution of the branch instruction.

15. A method for editing a binary code as recited in claim 12, wherein creating the binary patch to correspond to the branch instruction comprises:

defining a first instruction in the binary patch to be the instruction in the at least one of the plurality of binary code segments replaced with the branch instruction; and defining a last instruction in the binary patch to direct the program control to a subsequent instruction in the at least one of the plurality of binary code segments, the subsequent instruction immediately following the instruction in the at least one of the plurality of binary code segments replaced with the branch instruction.

16. A method for editing a binary code as recited in claim 7, wherein the binary code comprises a plurality of binary instructions, the plurality of binary instructions being executable by computer system circuitry.

17. A method for performing a combined transformation and branch slamming operation on a binary code to enable safe instrumentation of the binary code, comprising:

identifying a function body in the binary code;

copying the function body from the binary code to a shared object;

modifying one or more call instructions in the binary code to refer to the shared object, the one or more call instructions previously referring to the function body in the binary code;

identifying an instruction in the function body copied from the binary code to the shared object, the instruction to be replaced by a branch instruction;

preparing a binary patch to correspond to the branch instruction;

replacing the instruction in the function body copied from the binary code to the shared object with the branch instruction; and appending the binary patch to the shared object.

18. A method for performing a combined transformation and branch slamming operation on a binary code as recited in claim 17, wherein the function body comprises a sequence of instructions extending from an initial memory address to a final memory address, wherein the initial memory address and the final memory address reside in a memory of a computer system.

19. A method for performing a combined transformation and branch slamming operation on a binary code as recited in claim 18, wherein copying the function body from the binary code to the shared object comprises copying the function body comprising the sequence of instructions extending from the initial memory address to the final memory address such that the sequence of instructions extend from a new initial memory address to a new final memory address, the new initial memory address and the new final memory address being located outside a memory of the computer system occupied by the binary code.

20. A method for performing a combined transformation and branch slamming operation on a binary code as recited in claim 19, wherein the one or more call instructions are configured to direct a program control to the new initial memory address corresponding to the function body copied from the binary code.

21. A method for performing a combined transformation and branch slamming operation on a binary code as recited in claim 17, wherein the branch instruction directs a program control to the binary patch.

22. A method for performing a combined transformation and branch slamming operation on a binary code as recited in claim 17, wherein preparing the binary patch to correspond to the branch instruction comprises:

defining a first instruction in the binary patch to be the instruction in the function body copied from the binary code to the shared object to be replaced by the branch instruction; and defining a last instruction in the binary patch to direct a program control to a subsequent instruction in the function body copied from the binary code to the shared object, the subsequent instruction immediately following the instruction replaced with the branch instruction.

23. A method for performing a combined transformation and branch slamming operation on a binary code as recited in claim 17, wherein replacing the instruction in the function body copied from the binary code to the shared object with the branch instruction is performed without recompiling an original source code, the original source code having been used to create the function body copied from the binary code to the shared object.

24. A method for performing a combined transformation and branch slamming operation on a binary code as recited in claim 17, wherein replacing the instruction in the function body copied from the binary code to the shared object with the branch instruction is performed such that a machine state is preserved, the machine state comprising a plurality of register values and data existing immediately prior to an execution of the branch instruction.

25. A computer readable storage medium including program instructions for editing a binary code, comprising:

program instructions for transforming the binary code into a plurality of binary code segments including, program instructions for identifying one or more function bodies in the binary code;

program instructions for copying each of the one or more function bodies from the binary code to a shared object; and program instructions for modifying one or more call instructions in the binary code to refer to the shared object, the one or more call instructions previously referring to the one or more function bodies copied from the binary code;

program instructions for inserting a branch instruction into at least one of the plurality of binary code segments;

program instructions for creating a binary patch to correspond to the branch instruction; and program instructions for appending the binary patch to the at least one of the plurality of binary code segments.

26. A computer readable storage medium as recited in claim 25, wherein the binary code occupies a memory of a computer system.

27. A computer readable storage medium as recited in claim 25, wherein each of the one or more function bodies comprise a separate sequence of instructions extending from a corresponding initial memory address to a corresponding final memory address, wherein the corresponding initial memory address and the corresponding final memory address reside in a memory of a computer system.

28. A computer readable storage medium as recited in claim 27, wherein program instructions for copying each of the one or more function bodies from the binary code to the shared object comprise program instructions for copying each of the one or more function bodies comprising the separate sequence of instructions extending from the corresponding initial memory address to the corresponding final memory address such that the separate sequence of instructions extend from a new corresponding initial memory address to a new corresponding final memory address, the new corresponding initial memory address and the new corresponding final memory address being located outside a memory of the computer system occupied by the binary code.

29. A computer readable storage medium as recited in claim 25, wherein each of the one or more call instructions are configured to direct a program control from the binary code to one of the one or more function bodies copied from the binary code to the shared object, each of the one or more call instructions being further configured to direct the program control from the shared object back to the binary code upon completion of an execution of the one of the one or more function bodies copied from the binary code.

30. A computer readable storage medium as recited in claim 25, wherein program instructions for inserting the branch instruction into at least one of the plurality of binary code segments comprises:

program instructions for identifying an instruction in the at least one of the plurality of binary code segments; and program instructions for replacing the instruction in the at least one of the plurality of binary code segments with the branch instruction, the branch instruction directing a program control to the binary patch.

31. A computer readable storage medium as recited in claim 30, wherein replacing the instruction in the at least one of the plurality of binary code segments with the branch instruction is performed without recompiling an original source code, the original source code having been used to create the at least one of the plurality of binary code segments.

32. A computer readable storage medium as recited in claim 30, wherein replacing the instruction in the at least one of the plurality of binary code segments with the branch instruction is performed such that a machine state is preserved, the machine state comprising a plurality of register values and data existing immediately prior to an execution of the branch instruction.

33. A computer readable storage medium as recited in claim 30, wherein program instructions for creating the binary patch to correspond to the branch instruction comprises:

program instructions for defining a first instruction in the binary patch to be the instruction in the at least one of the plurality of binary code segments replaced with the branch instruction; and program instructions for defining a last instruction in the binary patch to direct the program control to a subsequent instruction in the at least one of the plurality of binary code segments, the subsequent instruction immediately following the instruction in the at least one of the plurality of binary code segments replaced with the branch instruction.

34. A computer readable storage medium as recited in claim 25, wherein the binary code comprises a plurality of binary instructions, the plurality of binary instructions being executable by computer system circuitry.

* * * * *